April 23, 1957  G. O. PERKINS  2,790,114

CENTRALIZED ALTERNATING CURRENT CONTROL SOURCE

Filed Dec. 23, 1952  4 Sheets-Sheet 1

UNITS SHOWN ABOVE INDICATE
NUMBER OF CLOSING MAGNETS
BEING OPERATED SIMULTANEOUSLY.

INVENTOR.
GORDON O. PERKINS

BY Ostrolenk & Faber

ATTORNEYS

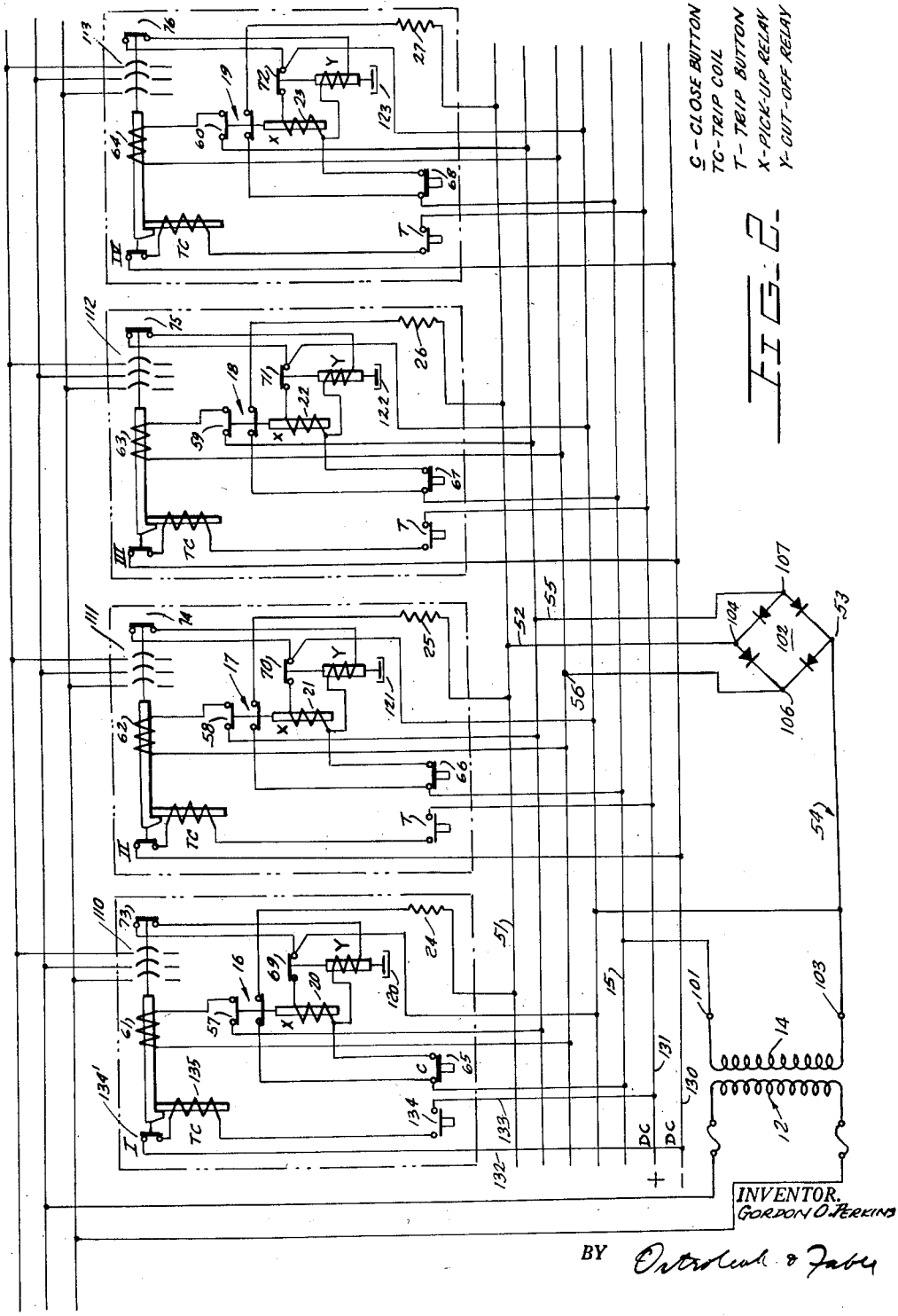

April 23, 1957   G. O. PERKINS   2,790,114
CENTRALIZED ALTERNATING CURRENT CONTROL SOURCE
Filed Dec. 23, 1952   4 Sheets-Sheet 3

INVENTOR.
GORDON O. PERKINS
BY
ATTORNEYS

INVENTOR.
GORDON O. PERKINS

United States Patent Office 2,790,114
Patented Apr. 23, 1957

2,790,114

CENTRALIZED ALTERNATING CURRENT CONTROL SOURCE

Gordon O. Perkins, Philadelphia, Pa., assignor to I-T-E Circuit Breaker Company, Philadelphia, Pa., a corporation of Pennsylvania Application December 23, 1952, Serial No. 327,505

4 Claims. (Cl. 317—137)

My invention relates to a novel system for applying electrical energy to the closing coils of circuit breakers, and more particularly relates to a novel system in which a plurality of parallel connected resistors are inserted in series with a common rectifier which is used to supply direct current to a plurality of closing coils associated with particular circuit breakers.

In the prior art arrangement the operation of a plurality of closing magnets, each individually associated with one of a plurality of circuit breakers of a switchboard, was energized through a rectifier from either the secondary of a step-down transformer or from an auxiliary source. That is, the necessary voltage for energizing the circuit was derived from either the available alternating current line or from an auxiliary power means. When the available alternating current source was used, or if the auxiliary power supply was an alternating current source, it was necessary to interpose a common rectifier between the transformer secondary and the closing magnets of the circuit breaker in order to rectify the alternating current before it was applied to the closing magnets.

Thus, in the prior art arrangement, an alternating current source was applied to the input of a rectifier with a single series aging resistor interposed therebetween. The plurality of closing magnet coils was inserted in parallel with the output of the common rectifier. Normally open circuits were provided for the series resistor of the input circuit and the closing magnet coils. When it was desired to automatically close one of the circuit breakers the single normally open switch associated with the input resistor and the normally open switch associated with the particular circuit breaker to be acted upon were closed.

Thus, if it were desired to simultaneously operate two circuit breakers it was necessary to close one normally open contact associated with the series input resistor and a normally open switch associated with each circuit breaker to be acted upon. Although this arrangement was desirable for closing only one circuit breaker at a time it had inherent limitations when it was required to simultaneously operate a plurality of circuit breakers. That is, since the magnitude of resistances which appeared in series with the common rectifier remained constant irrespective of the number of closing magnet coils which were to be energized the voltage drop across the resistor, and hence the rectifier (or that available at the closing magnet coils), was a direct function of the magnitude of current flowing therethrough.

Hence, if it became necessary to energize two closing magnet coils, thereby requiring twice the magnitude of energizing current, the voltage drop across the series resistance would increase two-fold.

In like manner, if it was necessary to simultaneously energize three closing magnet coils the percentage of line voltage across these coils would decrease three-fold.

Obviously, this scheme is limited when the total series resistances and impedances of the device become significant as compared to the rectifier bank itself, whether the devices are operated intermittently or continuously.

Accordingly, the prior art device had inherent limitations whereby an attempt to simultaneously energize three closing coil magnets resulted in a voltage drop across the series resistances of such a magnitude that insufficient voltage was available to the coils to effect their proper operation.

In a prior art arrangement designed to overcome the above mentioned disadvantages a separate aging resistor rectifier and closing coil was provided for each circuit breaker. However, this system has the obvious disadvantage of being too costly and expensive since it does not make maximum use of the component parts.

In my novel system a plurality of resistors are connected in parallel between the secondary winding of the transformer (or source of energy) and the input to a common rectifier with provision for inserting one or more resistors in accordance with the number and selection of simultaneously energized closing magnets.

Accordingly, with this novel arrangement the magnitude of resistance or impedance in series with the input to the common rectifier unit is rapidly and easily controlled in accordance with the number and selection of closing magnet coils to be energized. Hence, a simple and effective means is provided to insure that voltage control and regulation will be maintained for the input to the closing magnet coils. That is, the series circuit of each of the plurality of parallel connected resistors is normally open and may be selectively and automatically closed to thereby insert these resistors in series with the input of a common rectifier.

The plurality of closing magnets or coils is connected in parallel with the output of the common rectifier. Each of the series circuits of the parallel connected closing magnets is provided with normally open contacts which may be selectively and automatically closed in coordination with the heretofore mentioned normally closed contacts of the parallel connected resistors. That is, the resistors in each case are matched with a particular closing magnet coil and both are connected in the circuit by engagement of contacts carried on a single armature of an associated relay. That is, each of a plurality of relays is associated with a particular closing coil and its associated resistor and is instrumental in closing the normally open switches as above noted.

With this novel arrangement it is possible to provide a plurality of closing magnets, each requiring a different magnitude of current to render it operative and still be operated from a common rectifier. The voltage across each closing magnet is maintained within a predetermined operating range with a plurality of closing magnets which are operated simultaneously.

Accordingly, the total number of circuit breaker closing magnets that can be closed at rated voltage or minimum voltage will depend solely on the design of the system. This represents a decided advantage over the prior art arrangement wherein the rectifier was not coordinated with a variable resistance to compensate for increased voltage drop therein, thereby substantially increasing the voltage drop in the circuitry prior to the closing magnet.

As heretofore noted, it is possible to simultaneously close several breakers with full rated voltage from the power source with the circuitry of my novel invention. However, even though the circuit and components have the capacity for simultaneously closing a plurality of breakers on full rated voltage it may happen that the line voltage is not at the rated value. A more limiting case is where the line voltage from the power source has decreased to a value near the operating voltage of the circuit breaker closing magnets and in which it is required that more than one breaker be operated simultaneously at this value. Repeated use and experimentation on the prior art control circuits indicate that when the line voltage is dropped below rated value to some minimum voltage the system is not capable of operating more than one closing magnet at a time.

However, in my novel arrangement, whereby a plurality of parallel resistors are connected in series with the input to the rectifier, it is possible to simultaneously operate at least two closing magnets at a minimum operating voltage.

Furthermore, the number of closing magnets which can be closed at minimum voltage can be increased if the system is properly designed.

Accordingly, a primary object of my invention is to provide a novel control circuit having a common rectifier for all of the closing coils.

Still another object of my invention is to provide a novel arrangement for circuit components used for closing control of circuit breakers whereby a plurality of closing magnets may be operated simultaneously.

A still further object of my invention is to provide a control design wherein the total number of circuit breaker closing magnets that may be closed at rated or minimum voltage depends on the design of the system.

A still further object of my invention is to provide a centralized alternating current control system which is relatively economical and utilizes the minimum number of circuit components.

A further object of my invention is to provide a novel centrally located rectifier unit energized from an alternating current source.

A still further object of my invention is to provide a novel arrangement for closing magnet circuits in which a plurality of resistors are connected in parallel and are provided with normally open circuits.

A further object of my invention is to provide a control system having a plurality of parallel connected resistors which may be automatically and selectively inserted in the circuit.

Still another object of my invention is to provide a control system wherein the impedance inserted in series with a common rectifier may be automatically and selectively adjusted depending upon the number and particular closing magnet control relays which are to be energized simultaneously.

These and other objects of my invention will become apparent in the following description when taken in connection with the drawings in which:

Figure 2 is an electrical circuit diagram similar to Figure 1 showing the grouping of the various associated electrical components.

Figure 3A:
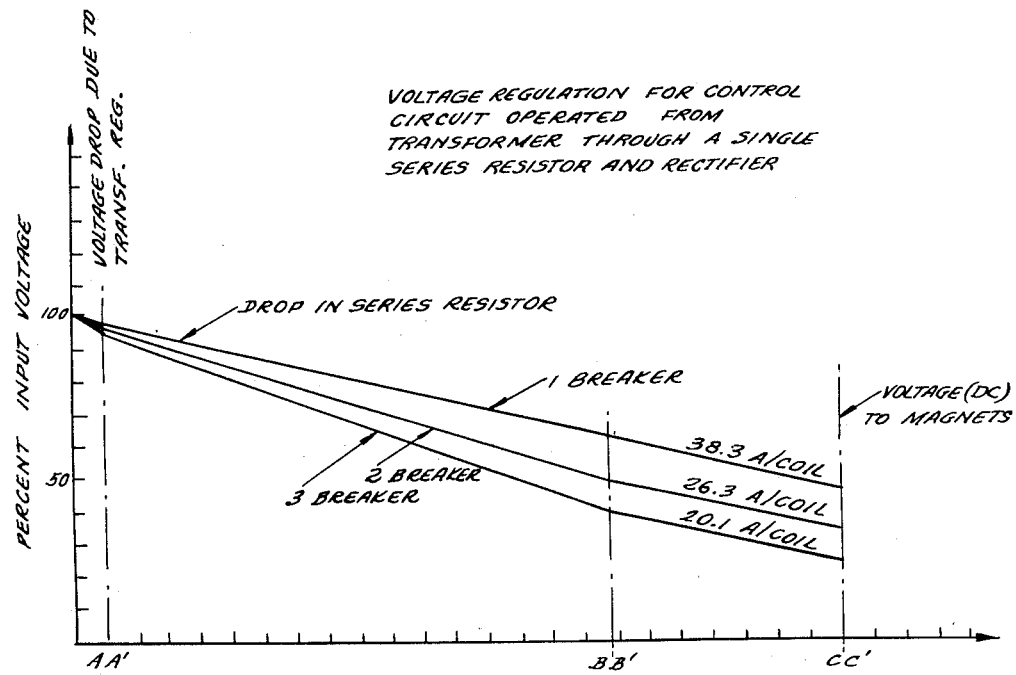

Figure 3a is a graphic representation illustrating the percentage of input voltage available at various terminals within the circuit when either one, two or three circuit breakers are simultaneously closed when operated through a single series resistor and rectifier of the prior art arrangement. This figure illustrates the large drop in voltage existing across the control magnets when a plurality of circuit breakers are simultaneously closed. It will be noted, for example, that when an attempt is made to simultaneously close three circuit breakers the percentage of input voltage available across each magnet is less than 25%.

Figure 3B:
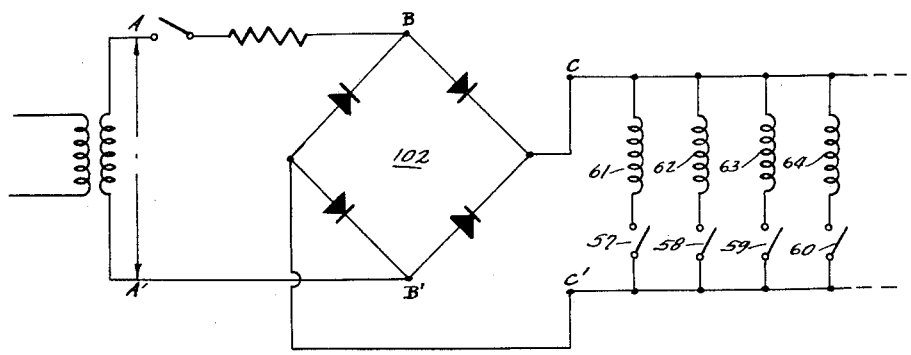

Figure 3b is a schematic circuit diagram illustrating the prior art arrangement whereby a plurality of closing magnet coils are energized from a transformer through a single series resistor and rectifier.

Figure 4A:
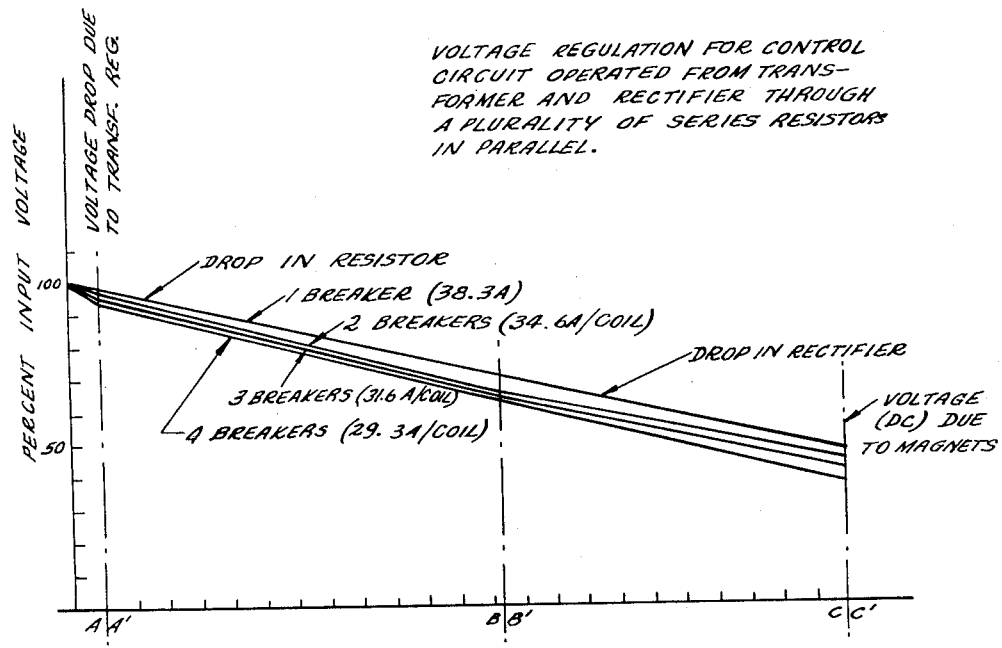

Figure 4a is a graphic representation illustrating the voltage regulation or voltage drop at various points within the control circuit when a plurality of circuit breakers are simultaneously energized from a transformer through a plurality of series resistors connected in parallel with a common transformer. This figure clearly illustrates that the voltage regulation remains fairly uniform irrespective of the number of closing magnet coils which are simultaneously energized. For example, the voltage available at terminal C—C' is approximately 56% of the input voltage when the system is called upon to close one circuit breaker. However, even when the system is called upon to simultaneously energize the closing coils for three circuit breakers the percentage of input voltage available at the terminals C—C' only drops to 46%. As heretofore noted in connection with the prior art arrangement illustrated in Figure 3a, these same conditions would result in a voltage drop from 56% on the closing of one circuit breaker to 34% of the input voltage when simultaneously closing three circuit breakers.

Figure 4B:
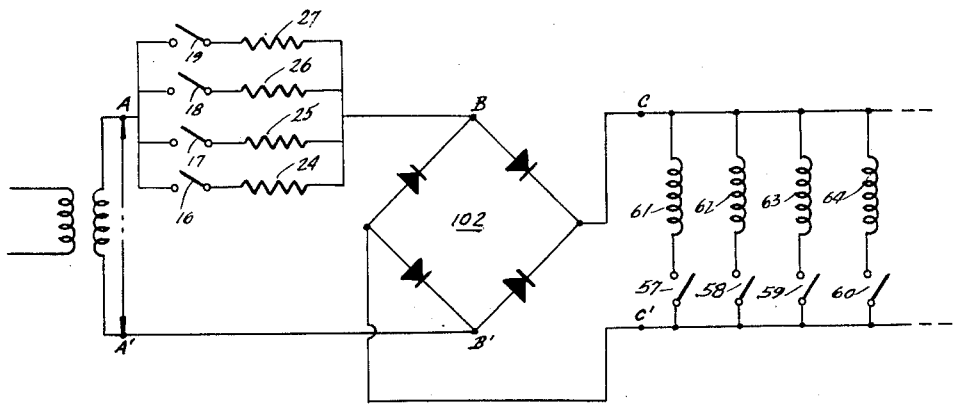

Figure 4b is a schematic representation of my novel circuit using the plurality of parallel resistors connected in series with the main rectifier.

Figure 5A:
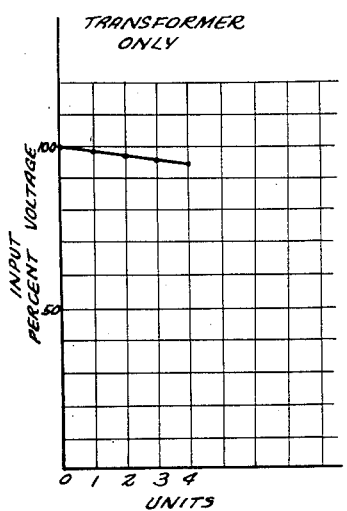

Figure 5a is a graphic illustration of the percentage of line voltage available at the transformer when either one, two, three or four circuit breakers are simultaneously closed.

Figure 5B:
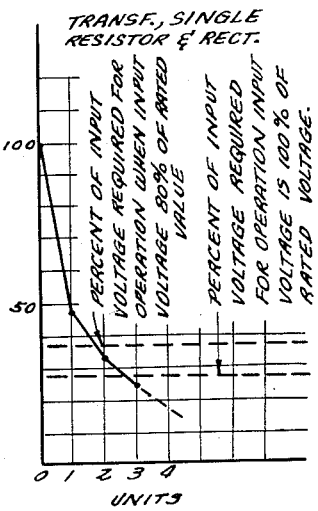

Figure 5b is a graphic illustration of the percentage of line voltage available at the closing magnet coils when either one, two, three or four circuit breakers are simultaneously closed with circuitry of the prior art, using a single resistor and rectifier as illustrated in Figures 3a and 3b..

Figure 5C:
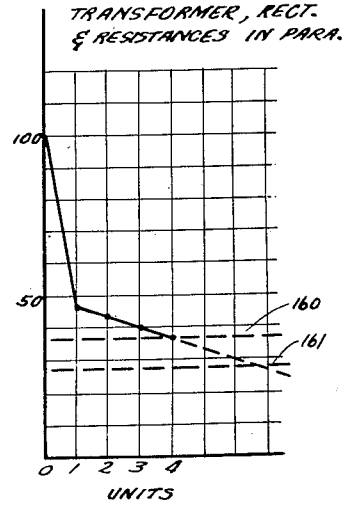

Figure 5c is a graphic illustration of the percentage of line voltage available at the closing magnet coils when either one, two, three or four circuit breakers are simultaneously closed with my novel system utilizing a single rectifier and a plurality of series resistances in parallel therewith.

Figure 1:
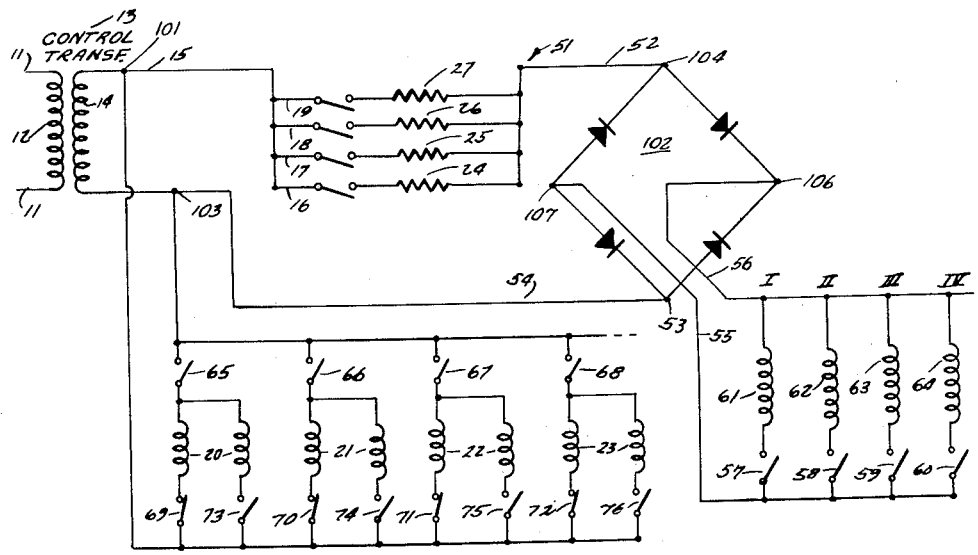
Figure 1 is a schematic electrical view of my novel centralized alternating current control system.

Referring now to Figures 1 and 2, a source of energy is fed through the conductors 11—11 to the primary winding 12 of the control transformer 13. The control transformer 13 is a step-down transformer with primary windings 12 and secondary winding 14. For purposes of illustration a common source of supply with two conductors 11—11 to the primary winding 12 would be 2,400 volts and the step-down transformer 13 would reduce this voltage so that 240 volts would appear across the terminals of the secondary winding 14.

A common bus 15 is fed from terminal 101 of the secondary winding 14 to a plurality of normally open contacts 16, 17, 18 and 19. For purposes of simplicity, the number of control circuits is limited to four in this illustration.

It will be apparent to those skilled in the art that any number of control circuits may be incorporated with the novel circuitry of my invention.

Each of the normally open contacts 16, 17, 18 and 19 forms one set of double-ganged contacts carried on the armature of its associated closing magnet control relay. That is, for example, as seen in Figure 2 in connection with the circuitry associated with the circuit breaker indicated by the numeral I, the closing magnet control relay 20-x is provided with an armature which carries the two normally open switches 16 and 57. In like manner the closing magnet control relay 21-x associated with the circuit breaker II is provided with an armature which carries normally open contacts 17 and 58. Thus, as will now be apparent, each of the plurality of circuit breakers I, II, III and IV is provided with an associated closing magnet control relay 20-x, 21-x, 22-x and 23-x, respectively.

A plurality of resistors 24, 25, 26 and 27, respectively associated with the normally open switches 16, 17, 18 and 19 (as best seen in Figure 1) is connected in parallel across the input to the common rectifier 102. Hence, individual circuits extend from the fixed terminals of the normally open switches 16, 17, 18 and 19 through the parallel connected resistors 24, 25, 26 and 27.

The plurality of resistors 24, 25, 26 and 27 connected together by means of bus 51 are electrically secured to the input terminal 104 of the rectifier 102 by means of the conductor 52. Thus, the terminal 101 of the secondary winding 14 is connected through conductor 15 to each of the plurality of normally open switches 16, 17, 18 and 19 and thence through their associated resistors 24, 25, 26 and 27 to the common bus 51 and conductor 52 to the input terminal 104 of the common rectifier 102.

The second terminal 103 of the secondary 14 is connected by means of conductor 54 to the opposite input terminal 53 of the common rectifier 102. The direct current output from the rectifier 102 is derived from the output terminals 106 and 107. The plurality of closing magnet coils 61, 62, 63 and 64, each respectively connected in series with the heretofore mentioned normally open switches 57, 58, 59 and 60 are connected in parallel, by means of conductors 55 and 56 across the output terminals 106, 107 of the common rectifier 102.

As best seen in the electrical circuit diagram of Figure 2 each of the plurality of closing magnet coils 61, 62, 63 and 64 is associated with a particular circuit breaker I, II, III or IV to effect engagement of their cooperating contacts 110, 111, 112 and 113, respectively.

Thus, it will be seen that when the pick-up relay 20-x is energized it will simultaneously close the normally open switches 16 and 57 to thereby permit the step-down voltage appearing at the terminals 101 and 103 of the secondary winding 14 to cause a current flow through conductor 15 to the resistor 24 and a conductor 54 to thereby energize the input terminals 53, 104 of the common rectifier 102.

Since the normally open switch 57 has been closed by the pick-up relay 20-x, the control magnet coil 61 will be energized from the output terminals 106, 107 of the common rectifier 102 through the conductors 55 and 56. That is, the direct current output of the recifier 102 is connected over the conductors or buses 55, 56 to the coils 61, 62, 63, 64 and normally open contacts 57, 58, 59, 60 when these latter contacts are closed.

The mechanical operation or control of the circuit is as follows: When the operator desires to cause engagement of the cooperating contacts 110 of the circuit breaker I the closing button 65 may be manually or automatically moved to the closed position. This will cause energization of the coil of the pick-up relay 20-x, thereby effecting simultaneous engagement of its associated normally open contacts 16 and 57 to establish an energizing circuit for the closing magnet coil 61 in the manner heretofore mentioned. When the circuit breaker I is almost closed the normally open contacts 73 will be moved to a closed position. As best seen in Figure 2, the normally open contact 73 is an integral part of the armature controlled by the closing magnet coil 61 and hence will be moved to the closed position by the energization of this latter coil.

Closing of the normally open switch 73 due to the energization of the closing magnet coil 61 will complete an energizing circuit for the cut-off relay coil 20-y. The cut-off relay 20-y is provided with a dashpot 120 to effect time delayed operation in a well known manner.

After a predetermined time delay governed by the dashpot 120, the energized cut-off coil 20-y will move the normally closed switch 69 to the open position. The opening of the normally closed switch 69 will cause de-energization of the pick-up relay coil 20-x and thereby effect disengagement of the contacts 16 and 57.

The opening of the contact 57 will thereby cause de-energization of the closing magnet coil 61.

It will be noted that the circuit breaker schematically illustrated in Figure 2 may be of any design well known in the art. Hence, after the closing coil 61 has been instrumental in moving the cooperating contacts 110 to the contact engaged position the mechanism of the circuit breaker will latch, thereby eliminating the necessity of an auxiliary source, such as closing the coil 61, to maintain these contacts in engaged position.

Accordingly, when the closing magnet coil 61 is de-energized by the interruption of the circuit due to the opening of contact 57 the circuit breaker I will remain in the closed or contact engaged position.

From the foregoing description it will now be apparent that the closing magnet coil 61 was energized by means of inserting a single series resistor 24 in series with the common rectifier 102 irrespective of the number of circuit breakers which are to be simultaneously operated. The resistor 24 will always be associated with the closing magnet coil 61 so that current will flow through this former unit whenever the latter is energized. That is, the same resistor is always connected in series for any given circuit breaker operation.

Accordingly, any single closing button 65, 66, 67 or 68 can be operated to the closed position to operate its corresponding pick-up relay 20, 21, 22 and 23, thereby causing their associated contacts 16, 17, 18, 19 and 57, 58, 59, 60 to be closed.

With this arrangement the corresponding resistor 24, 25, 26 or 27 will always be inserted in series between the transformer secondary winding 14 and the rectifier unit 102.

In like manner, the corresponding closing magnet coils 61, 62, 63 or 64 will always be energized to the respective circuits closed by the contacts 57, 58, 59, 60.

Hence, it will be apparent that simultaneous operation of more than one pick-up relay, that is, simultaneous closing of any combination of the closing buttons 65, 66, 67, 68, will insert more than one resistor between the transformer secondary 14 and the rectifier unit 102 so that a plurality of resistors are in parallel with one another and connected in series between the transformer and rectifier unit whenever a plurality of circuit breakers are to be simultaneously closed.

Thus it will be apparent that by providing a novel control system wherein the number of parallel resistors inserted in series with the input of the main rectifier can be controlled in accordance with the number of circuit breakers to be closed complete and accurate control over the input impedance or voltage drop can be maintained.

Hence, although there will be a corresponding increase in the current drawn when a number of circuit breakers are to be simultaneously closed there will be a compensating total reduction of the magnitude of resistance in series with the input to the rectifier due to the parallel insertion thereof.

Hence, the potential drop due to the increased current will still remain substantially in the operating range of the closing magnets.

As best seen in Figure 2, the circuitry provided for my novel control system is also provided with electrical means whereby the control circuit breakers may be manually tripped to the open or circuit interrupted position. For this circuit a direct current source supplied from the buses 130 and 131 is provided. Leads 132 and 133, connected to the direct current buses 130 and 131, provide a series circuit for the trip button 134 and a trip coil 135. Energization of the trip coil 135 will be effective to cause its armature to disengage from the latch detent, thereby permitting appropriate biasing means to move the cooperating contacts of the circuit breaker I to the contact disengaged position.

It will be noted that contact 134' is inserted in series with the trip circuit 132, 135, 134, 133. This contact 134', controlled by the circuit breaker 110, is closed when the circuit breaker is closed and opened when the circuit breaker is opened.

The trip coils and trip buttons, respectively illustrated by "TC" and "T" in the circuitry associated with the circuit breakers of II, III and IV function and operate in substantially the same manner as set forth for the trip button 134 and trip coil 135 in connection with circuit breaker I.

Figure 3a is a graphic illustration of the voltage regulation which is obtained in the prior art arrangement wherein a single series resistor is connected to the input of the rectifier as seen in Figure 3b. The ordinate of this diagram is calibrated in the percent of input voltage and the abscissa indicates the terminals within the circuit at which the voltage is measured. Thus, it will be seen that when one circuit breaker is closed, for example, when a single closing magnet coil is energized (as seen in Figure 3b) the voltage existing at the terminals B—B' will be 63% of the input voltage and the voltage existing at the terminal C—C' will be 56%. However, when it is necessary to simultaneously close three circuit breakers it is found that the available voltage at the terminal C—C' drops from 56% to 26% of the input voltage as seen from the lower curve in Figure 3a. That is, since the magnitude of the series resistor 150 remains constant, and since the magnitude of energizing voltage required for a plurality of closing magnet coils such as 68 and 69 will be substantially increased, the voltage drop across the resistor will be substantially increased, thereby rendering very poor voltage regulation.

In contradistinction the graphic representation of Figure 4a, which illustrates the voltage regulation obtained with my novel control system, is maintained fairly uniform irrespective of the number of circuit breakers which are simultaneously closed. For example, as seen in Figure 4a, the voltage available at terminals C—C', as noted in the schematic figure of my novel circuit in Figure 4a, will be 56% of the input voltage when one circuit breaker is closed. However, even though four circuit breakers may be simultaneously operated, as indicated by the lower curve, the voltage available at terminals C—C' only drops to 36%. In the event that only three circuit breakers are simultaneously closed, the voltage available at terminals C—C' is 40% of the input voltage.

Thus, it will be seen that in the prior art arrangement, due to the fact that the input resistance remains substantially constant, the simultaneous closing of three circuit breakers will result in a voltage drop so that the magnitude of voltage applied to the closing magnet coils will be only 25% of the input voltage whereas in my novel arrangement when three circuit breakers are simultaneously closed the voltage available at the closing magnet coils will be 40% of the input voltage.

Reference to Figures 5b and 5c clearly illustrates the comparative voltage regulation achieved in the prior art arrangement and in my novel device by plotting percentage of input voltage versus the number of units which are simultaneously operated. The horizontal dotted line 160 indicates the percentage of input voltage required for operation of the closing magnet coils when the input voltage is 80% of the rated voltage. The horizontal dotted line 161 indicates the percentage of input voltage required for operation of the closing magnet coils when the input voltage is 100% of the rated voltage.

Thus it will be clearly seen that in the prior art arrangement when two circuit breakers are simultaneously operated the percentage of input voltage available at the operating magnet coil will be approximately 34%. However, in the event that the line voltage should drop to 80% of the rated voltage it is seen by the dotted line 160 that it is necessary to have at least 36% of the input voltage applied to the closing magnet coil in order to sufficiently energize it for proper operation.

It will, therefore, be apparent that in the single resistor reactor arrangement, as schematically shown in Figure 3b and graphically illustrated in Figure 5b, the attempt to simultaneously close two circuit breakers when the line voltage is 80% of the rated voltage will result in failure of the system.

In contradistinction, as seen in Figure 5c, it will be noted that when two circuit breakers are simultaneously closed in my novel arrangement the percentage of line voltage available at the closing magnet coil will be 42%, which is 6% greater than the minimum voltage required to operate said coils when the line voltage is at 80% of its rated value.

Accordingly, by using a system of parallel resistors it is possible to simultaneously close several circuit breakers even though the line voltage has decreased below its rated value.

It will be further noted that in the prior art arrangement of a single resistor and reactor the simultaneous closing of two, three or four circuit breakers sufficiently reduced the available voltage at the closing magnet coil so that the device was inoperative in the event that the input voltage was 80% or less of the rated line voltage. However, as clearly illustrated in Figure 5c, in the novel arrangement of my invention, whereby a plurality of parallel resistors may be inserted in series with the reactor, it is possible to simultaneously close four circuit breakers even though the input voltage is less than 80% of the rated value.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appended claims.

I claim:

1. A circuit for selectively closing predetermined numbers of circuit breakers by energy from an alternating current source, a plurality of resistors, a rectifier having input and output terminals, and a plurality of closing magnets; normally open resistor contacts; each of said plurality of resistors being individual to one of said closing magnets, each of said plurality of resistors being connected in series with said normally open resistor contacts, normally open magnet contacts, each of said closing magnets being connected in series with a normally open magnet contact, said normally open contacts individual to said resistors and said resistors being connected in parallel with each other and connected to one of the input terminals of said rectifier, said normally open contacts individual to said closing magnets and said closing magnets being connected in parallel with each other and across the output terminals of said rectifier; and means to selectively simultaneously close said normally open switches of said resistors and individual closing magnets.

2. A circuit for selectively closing predetermined numbers of circuit breakers by energy from an alternating current source, a plurality of resistors, a rectifier having input and output terminals and a plurality of closing magnets; normally open resistor contacts; each of said plurality of resistors being individual to one of said closing magnets, each of said plurality of resistors being connected in series with said normally open resistor contacts, closing magnet contacts, each of said closing magnets being connected in series with an individual one of said magnet contacts, said normally open resistor contacts associated with said resistors and said resistors connected in parallel with each other and connected in series between said source and the input to said rectifier, said normally open magnet contacts associated with said closing magnets and said closing magnets being connected in parallel with each other and across the output terminals of said rectifier, a plurality of pick-up relays, each of said pick-up relays being individual to said resistors and closing magnets, and circuit connections for selectively operating said pick-up relays to close the individual resistor and closing magnet contacts.

3. In a control system for energizing the coils of a plurality of circuit breaker closing magnets, a rectifier, a plurality of closing magnets, a plurality of resistors, each being individual to one of said closing magnets, a plurality of normally open resistor switches, each being individual to one of said closing magnets, a plurality of normally open closing magnet switches, each being individual to one of said closing magnets, and a plurality of control means; each resistor switch and resistor individual to a closing magnet being connected in series, the series connected resistor switches and resistors being connected in parallel with each other, said parallel combination of series connected resistor switches and resistors being connected in series with the input to said rectifier, each closing magnet switch and its individual closing magnet being connected in series; each of the magnet switches and their individual closing magnets being connected in parallel with other of said magnet switches and closing magnets, said parallel magnet switches and closing magnets combination being electrically series connected to the output terminals of said rectifier, said control means simultaneously operating a resistor switch and individual magnet switch when operated to thereby maintain substantially constant voltage regulation across the input and output terminals of said rectifier.

4. In a control system for energizing the coils of a plurality of circuit breaker closing magnets, a rectifier, a plurality of closing magnet coils, a plurality of resistors, each being individual to one of said closing magnets, a plurality of normally open resistor switches, each being individual to one of said closing magnets, a plurality of normally open opening magnet switches, each being individual to one of said closing magnets, and a plurality of control means; each resistor switch and resistor individual to a closing magnet being connected in series, the series connected resistor switches and resistors being connected in parallel with each other, said parallel combination of series connected resistor switches and resistors being connected in series with the input to said rectifier, each magnet switch and its individual closing magnet being connected in series; each of the magnet switches and their individual closing magnets being connected in parallel with other of said magnet switches and closing magnets, said parallel magnet switches and closing magnets combination being electrically series connected to the output terminals of said rectifier, said control means simultaneously operating a resistor switch and individual magnet switch when operated for controlling the magnitude of resistance inserted in series with said rectifier.

References Cited in the file of this patent

UNITED STATES PATENTS

| 2,559,611 | Garmany | July 10, 1951 |
| 2,618,706 | Kalfaian | Nov. 18, 1952 |
| 2,654,063 | Cohen | Sept. 29, 1953 |

FOREIGN PATENTS

| 309,398 | Great Britain | Apr. 9, 1929 |